United States Patent
Awatsu et al.

(10) Patent No.: US 8,972,741 B2
(45) Date of Patent: Mar. 3, 2015

(54) METHOD OF MODIFICATION OF AUTHORIZATION DETAILS FOR A BIOMETRICS AUTHENTICATION DEVICE, BIOMETRICS AUTHENTICATION METHOD, AND BIOMETRICS AUTHENTICATION DEVICE

(75) Inventors: Kiyotaka Awatsu, Inagi (JP); Takahiro Kudoh, Inagi (JP); Masashi Sano, Inagi (JP); Masanori Ohkoshi, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1225 days.

(21) Appl. No.: 11/337,563

(22) Filed: Jan. 24, 2006

(65) Prior Publication Data

US 2007/0022303 A1    Jan. 25, 2007

(30) Foreign Application Priority Data

Jul. 22, 2005  (JP) .................................. 2005-212078

(51) Int. Cl.
*G06F 21/00* (2013.01)
*G07C 9/00* (2006.01)
(Continued)

(52) U.S. Cl.
CPC ............ *G07C 9/00071* (2013.01); *G06F 21/32* (2013.01); *G06Q 20/341* (2013.01); *G06Q 20/3674* (2013.01); *G06Q 20/4014* (2013.01); *G06Q 20/40145* (2013.01);
(Continued)

(58) Field of Classification Search
USPC ......... 713/186, 155, 159, 168, 169, 172, 182, 713/185; 382/115; 340/5.82; 705/18, 67; 380/277, 278, 279; 726/6, 7, 9, 16, 17, 726/18, 19, 20, 21, 28, 30
See application file for complete search history.

(56) References Cited

U.S. PATENT DOCUMENTS 4,837,422 A * 6/1989 Dethloff et al. ............... 235/380
5,689,708 A * 11/1997 Regnier et al. ................ 709/229
(Continued)

FOREIGN PATENT DOCUMENTS

| | | |
|---|---|---|
| EP | 0 262 025 A2 | 3/1988 |
| EP | 1 696 358 A1 | 8/2006 |

(Continued)

OTHER PUBLICATIONS

Search Report dated Nov. 7, 2007, issued in corresponding European Patent Application No. EP 06 25 0510.
(Continued)

*Primary Examiner* — Jeffrey Williams
(74) *Attorney, Agent, or Firm* — Westerman, Hattori, Daniels & Adrian, LLP

(57) ABSTRACT

A biometrics authentication device utilizes biometrics information and performs individual authentication enables secure modification of authorization details for an authorized agent other than the principal. A verification device verifies biometrics information registered on an IC card against biometrics information detected by a detection unit. When results in satisfactory biometrics authentication, modification of authorization details of an authorized agent, registered on the IC card, is permitted. Authorization details for an authorized agent can be securely modified on a card on which biometrics information for the principal and the authorized agent is registered.

7 Claims, 14 Drawing Sheets

(51) Int. Cl.

| | |
|---|---|
| *G06F 21/32* | (2013.01) |
| *G06Q 20/34* | (2012.01) |
| *G06Q 20/36* | (2012.01) |
| *G06Q 20/40* | (2012.01) |
| *G07F 7/10* | (2006.01) |
| *G07F 19/00* | (2006.01) |

(52) U.S. Cl.
CPC ............. *G07F 7/1008* (2013.01); *G07F 19/20* (2013.01); *G07C 9/00857* (2013.01)
USPC .................. 713/186; 726/17; 726/18; 726/20

(56) References Cited

U.S. PATENT DOCUMENTS

| | | | | |
|---|---|---|---|---|
| 5,790,674 | A * | 8/1998 | Houvener et al. .............. 713/185 |
| 6,941,274 | B1 * | 9/2005 | Ramachandran et al. . 705/26.35 |
| 7,043,643 | B1 * | 5/2006 | Doe et al. ....................... 713/189 |
| 7,216,803 | B2 * | 5/2007 | Nwosu .......................... 235/380 |
| 7,508,957 | B2 * | 3/2009 | Awatsu et al. ................. 382/115 |
| 7,508,958 | B2 * | 3/2009 | Awatsu et al. ................. 382/115 |
| 7,984,847 | B1 * | 7/2011 | Knouff et al. ................. 235/379 |
| 8,121,948 | B2 * | 2/2012 | Gustin et al. ..................... 705/43 |
| 2002/0073416 | A1 * | 6/2002 | Ramsey Catan ................... 725/6 |
| 2002/0095386 | A1 * | 7/2002 | Maritzen et al. ................. 705/64 |
| 2002/0198806 | A1 * | 12/2002 | Blagg et al. ..................... 705/35 |
| 2003/0005336 | A1 * | 1/2003 | Poo et al. ....................... 713/202 |
| 2003/0074568 | A1 * | 4/2003 | Kinsella et al. ............... 713/186 |
| 2004/0015702 | A1 * | 1/2004 | Mercredi et al. .............. 713/182 |
| 2004/0020984 | A1 * | 2/2004 | Clark ............................. 235/382 |
| 2004/0021552 | A1 * | 2/2004 | Koo ............................. 340/5.53 |
| 2005/0010483 | A1 * | 1/2005 | Ling ............................... 705/26 |
| 2005/0171898 | A1 * | 8/2005 | Bishop et al. ................... 705/39 |
| 2005/0247797 | A1 * | 11/2005 | Ramachandran ............. 235/492 |
| 2006/0036547 | A1 * | 2/2006 | Yasuhara ......................... 705/44 |
| 2007/0168283 | A1 * | 7/2007 | Alvarez et al. .................. 705/43 |
| 2010/0102119 | A1 * | 4/2010 | Gustin et al. .................. 235/379 |
| 2012/0221470 | A1 * | 8/2012 | Lyon ............................... 705/44 |

FOREIGN PATENT DOCUMENTS

| | | |
|---|---|---|
| JP | 2000-067198 A | 3/2000 |
| JP | 2001-67523 | 3/2001 |
| JP | 2001-202494 | 7/2001 |
| JP | 2002-197381 A | 7/2002 |

OTHER PUBLICATIONS

Chinese Office Action dated Dec. 25, 2009, issued in corresponding Chinese Patent Application No. 200610007787.
Japanese Office Action dated Jun. 28, 2011, issued in corresponding Japanese Patent Application No. 2005-212078.
Chinese Office Action dated Sep. 15, 2011, issued in corresponding Chinese Patent Application No. 200610007787.X.
Decision to Refuse a European Patent Application dated Feb. 22, 2013, issued in corresponding European Patent Application No. 06 250 510.2 (13 pages).

* cited by examiner

VEIN IMAGE N1

|   | 0 | 1 | 2 | 3 | 4 |
|---|---|---|---|---|---|
| 0 | 255 | 255 | 0 | 255 | 255 |
| 1 | 255 | 255 | 0 | 0 | 0 |
| 2 | 255 | 255 | 0 | 255 | 0 |
| 3 | 0 | 0 | 255 | 0 | 0 |
| 4 | 0 | 0 | 0 | 255 | 0 |

VEIN IMAGE N2

|   | 0 | 1 | 2 | 3 | 4 |
|---|---|---|---|---|---|
| 0 | 255 | 255 | 0 | 0 | 255 |
| 1 | 255 | 255 | 255 | 0 | 0 |
| 2 | 255 | 255 | 0 | 255 | 255 |
| 3 | 0 | 0 | 255 | 255 | 0 |
| 4 | 0 | 0 | 0 | 255 | 255 |

FIG. 14

| NAME |||||
| --- |
| PROXY |||||
| BIOMETRICS ATTRIBUTES (EXAMPLE: RIGHT HAND/LEFT HAND) |||||
| ACCOUNT INFORMATION INDEX 1 |||||
| EXPIRATION DATE |||||
| MONETARY LIMIT |||||
| TRANSACTION ITEM | WITHDRAWAL | DEPOSIT | TRANSFER TO ANOTHER ACCOUNT | TRANSFER BETWEEN ACCOUNTS |
| PRINCIPAL (SETTING) FLAG | 1 | 1 | 1 | 0 |
| PROXY FLAG | 1 | 1 | 1 | 0 |

FIG. 15

| NAME |||||
| --- |
| PROXY |||||
| BIOMETRICS ATTRIBUTES (EXAMPLE: RIGHT HAND/LEFT HAND) |||||
| ACCOUNT INFORMATION INDEX 1 |||||
| EXPIRATION DATE |||||
| MONETARY LIMIT |||||
| TRANSACTION ITEM | WITHDRAWAL | DEPOSIT | TRANSFER TO ANOTHER ACCOUNT | TRANSFER BETWEEN ACCOUNTS |
| PRINCIPAL (SETTING) FLAG | 1 | 1 | 1 | 0 |
| PROXY FLAG | 0 | 1 | 1 | 0 |

METHOD OF MODIFICATION OF AUTHORIZATION DETAILS FOR A BIOMETRICS AUTHENTICATION DEVICE, BIOMETRICS AUTHENTICATION METHOD, AND BIOMETRICS AUTHENTICATION DEVICE

CROSS-REFERENCE TO RELATED APPLICATIONS

This application is based upon and claims the benefit of priority from the prior Japanese Patent Application No. 2005-212078, filed on Jul. 22, 2005, the entire contents of which are incorporated herein by reference.

BACKGROUND OF THE INVENTION

1. Field of the Invention

The present invention relates to a method of modification of authorization details for a biometrics authentication device, a biometrics authentication method, and a biometrics authentication device, to perform individual authentication using characteristics of a portion of a human body. In particular, the present invention relates to a method of modification of authorization details for a biometrics authentication device, a biometrics authentication method, and a biometrics authentication device, to permit individual authentication using biometrics information of an authorized agent other than the principal.

2. Description of the Related Art

There are numerous portions of the human body which can be used to differentiate the individual, such as fingerprints and toeprints, the retinas of the eyes, facial features, and blood vessels. With advances in biometrics technology in recent years, various devices have been provided which identify biometrics features of a portion of the human body to authenticate individuals.

For example, because blood vessels and prints of the palms and fingers of the hands provide a comparatively large quantity of individual characteristic data, they are suitable with respect to reliability of individual authentication. Blood vessel (vein) patterns in particular remain unchanged throughout life from infancy and are regarded as being completely unique, and so are well-suited to individual authentication. Of this, individual authentication technology based on blood vessel images in the palm of the hand is explained.

First, at the time of registration or of authentication, the user brings his palm into proximity with an image capture device. The image capture device emits near-infrared rays, which are incident on the palm of the hand. The image capture device uses a sensor to capture near-infrared rays rebounding from the palm of the hand. Hemoglobin in the red corpuscles flowing in the veins has lost oxygen. This hemoglobin (reduced hemoglobin) absorbs near-infrared rays at wavelengths near 760 nanometers. Consequently when near-infrared rays are made incident on the palm of a hand, reflection is reduced only in the areas in which there are veins, and the intensity of the reflected near-infrared rays can be used to identify the positions of veins.

The user first uses an image capture device to register vein image data of the palm of his own hand on a card. Then, in order to perform individual authentication, the user employs an image capture device to cause the vein image data of his own hand to be read. The registered vein image recorded on the card, and retrieved using the ID of the user, is verified against the vein pattern of the vein image for verification thus read to perform individual authentication.

On the other hand, in the field of fingerprint authentication, a method of biometrics authentication of an authorized agent has been proposed in which fingerprint information for an authorized agent other than the principal is registered in advance, and by performing fingerprint authorization of the authorized agent, a single card can be used for biometrics authentication of an authorized agent (see for example Japanese Patent Laid-open No. 2001-067523) and Japanese Patent Laid-open No. 2001-202494). That is, the fingerprints of an authorized agent who has received the consent of the principal are registered, enabling biometrics authentication of the authorized agent. In this method of the prior art, at the time of card issue, the biometrics information of the principal and, with the consent of the principal, the biometrics information of the authorized agent are registered as authorization details.

For example, in Japanese Patent Laid-open No. 2001-067523, on a single card, the principal is registered so as to be able to perform all transactions (deposits, withdrawals, fund transfers from an ordinary deposit account, deposits, withdrawals, fund transfers from a savings deposit account, and similar), and an authorized agent (proxy) is registered so as to be able to perform a portion of these (for example, deposits and withdrawals to and from the ordinary account) in the use of ATM (automated transaction machine) that utilizes biometrics authentication for transaction processing. To this end, authorization details for the authorized agent can be stipulated, and a single card can be used by both the principal and the authorized agent, for greater convenience.

On the other hand, in actual features there is a need for the biometrics information of an authorized agent to be registered or deleted on a card on which the biometrics information of the principal has first been registered. Further, there is also a need for previously registered authorization details of an authorized agent to be modified. For example, there may be a need to change authorization details when there are changes in the employment situation or family composition of the authorized agent.

Using the technology of the prior art, however, it is difficult to register, modify, or delete the biometrics information of the authorized agent securely to satisfy this demand, and the security of the authorization method based on biometrics authentication is impeded. As a result, widespread adoption of such an authorization method is difficult.

SUMMARY OF THE INVENTION

Hence an object of the invention is to provide a method of modification of authorization details for a biometrics authentication device, biometrics authentication method, and biometrics authentication device, enabling secure modification of the authorization details of an authorized agent on a card on which biometrics information for the principal has been registered.

Another object of the invention is to provide a method of modification of authorization details for a biometrics authentication device, biometrics authentication method, and biometrics authentication device, to enable secure modification of authorization details by the authorized agent himself on a card on which biometrics information for the principal has been registered.

Still another object of the invention is to provide a method of modification of authorization details for a biometrics authentication device, biometrics authentication method, and biometrics authentication device, to enable secure modification of authorization details for an authorized agent by the principal on a card on which biometrics information for the principal has been registered.

In order to attain these objects, a method of modification of authorization details of this invention for a biometrics authentication device is a method in which biometrics characteristic data of a human body is detected from the body and is verified against biometrics characteristic data registered in advance on an IC card to perform individual authentication. This method has a step of detecting the biometrics characteristic data from the human body; a step of verifying the detected biometrics characteristic data against biometrics characteristic data registered in advance on an IC card; a step, when the verification result is satisfactory, of permitting modification of the authorization details of an authorized agent other than the principal, set by the principal who owns the IC card; and a step of registering the modified authorization details for the authorized agent in the IC card.

Further, a biometrics authentication method of this invention has a step of detecting biometrics characteristic data from a human body; a first verification step of verifying the detected biometrics characteristic data against biometrics characteristic data registered in advance in an IC card; a step, when the verification result is satisfactory, of permitting modification of authorization details for an authorized agent other than the principal, set by the principal who is the owner of the IC card; a step of registering the modified authorization details of the authorized agent in the IC card; a second verification step of verifying the detected biometrics characteristic data against the biometrics characteristic data of the principal or the authorized agent, registered in the IC card; and a step, when the verification result for the authorized agent is satisfactory, of permitting processing using the authorization details registered in the IC card.

Further, a biometrics authentication device of this invention detects biometrics characteristic data from a human body, verifies the data against biometrics characteristic data registered in advance in an IC card, and performs individual authentication. The biometrics authentication device has a detection unit for detecting the biometrics characteristic data from the human body, and a verification unit for verifying the detected biometrics characteristic data against biometrics characteristic data of the principal, registered in advance in the IC card; when the verification result is satisfactory, the verification unit permits modification of the authorization details of an authorized agent other than the principal, set by the principal who is the owner of the IC card, and moreover registers the modified authorization details for the authorized agent in the IC card.

In this invention, it is preferable that the verification step has a step of verifying the biometrics characteristic data, registered in advance, of the principal and of the authorized agent, against the detected biometrics characteristic data, and that the permission step has a step, when the verification result for the principal is satisfactory, of permitting modification of the authorization details of the authorized agent other than the principal, set in the IC card by the principal who is the owner of the IC card.

In this invention, it is preferable that the verification step has a step of verifying the biometrics characteristic data, registered in advance, of the principal and of the authorized agent, against the detected biometrics characteristic data, and that the permission step has a step, when the verification result for the authorized agent is satisfactory, of permitting modification of the authorization details of the authorized agent within the range of authorization details for the authorized agent other than the principal, set in the IC card by the principal who is the owner of the IC card.

It is preferable that the invention further has a step of reading authorization details for the authorized agent in the IC card and a step of selecting the authorized details for the authorized agent from the read-out authorization details, and that the registration step has a step of registering the selected authorization details for the authorized agent in the IC card.

In this invention, it is preferable that the read-out step has a step of reading flag-format authorization details registered in the IC card, and that the registration step has a step of updating a flag of the authorization details in the IC card using the selected authorization details for the authorized agent.

In this invention, it is preferable that the registration step has a step of registering, in the IC card, biometrics characteristic data of the principal and the authorized agent, and management data to discriminate biometrics characteristic data for the principal and for the authorized agent, and to store the authorization details.

In this invention, it is preferable that the reading step has a step of reading flag-format principal authorization details, set by the principal in the IC card, and flag-format authorized agent authorization details, set by the authorized agent, and that the registration step has a step of updating a flag of the authorized agent authorization details in the IC card, using the selected authorization details of the authorized agent.

In this invention, it is preferable that the permission step has a step of permitting modification of transaction details, which are authorization details for an authorized agent other than the principal, set by the principal who is the owner of the IC card.

In this invention, authorization details for a proxy which have been initially set by the principal can be modified by the principal or by a proxy with validation by the principal, and moreover, authorization details for the proxy can be modified independently by the proxy. Hence the authorization details for the proxy can be modified as appropriate when there are changes in the employment situation or family composition of the proxy, and various types of control can be flexibly realized based on biometrics authentication.

BRIEF DESCRIPTION OF THE DRAWINGS

FIG. 14 explains the proxy management data of FIG. 8 and FIG. 9;

FIG. 15 explains the proxy management data of FIG. 10;

DESCRIPTION OF THE PREFERRED EMBODIMENTS

Below, embodiments of the invention are explained in the order of a biometrics authentication device, configuration of biometrics authentication, biometrics information registration/authentication processing, transaction processing using biometrics authentication, and other embodiments.

Biometrics Authentication Device

Figure 1:
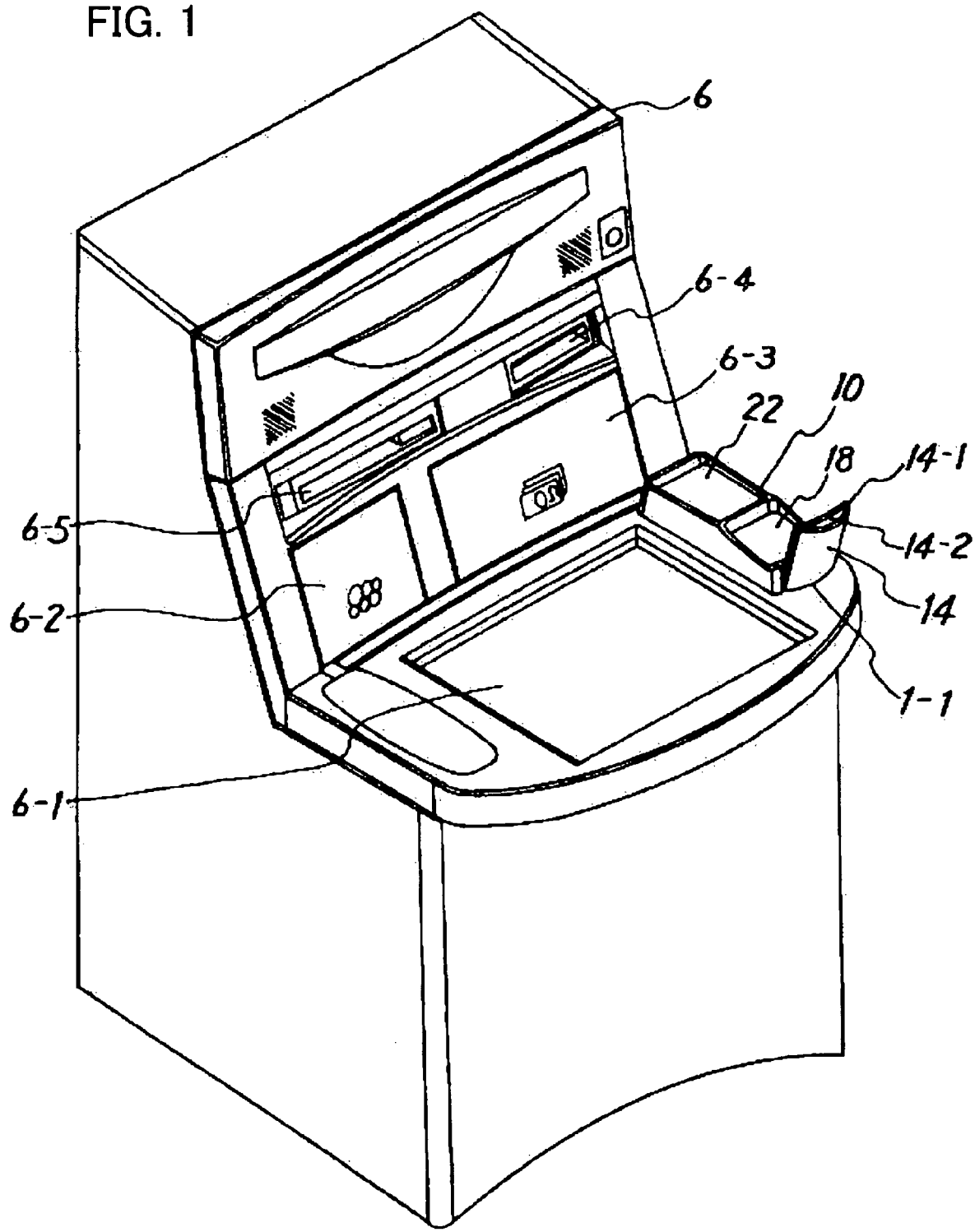
FIG. 1 is a perspective view of a biometrics authentication device of an embodiment of the invention.
Figure 2:
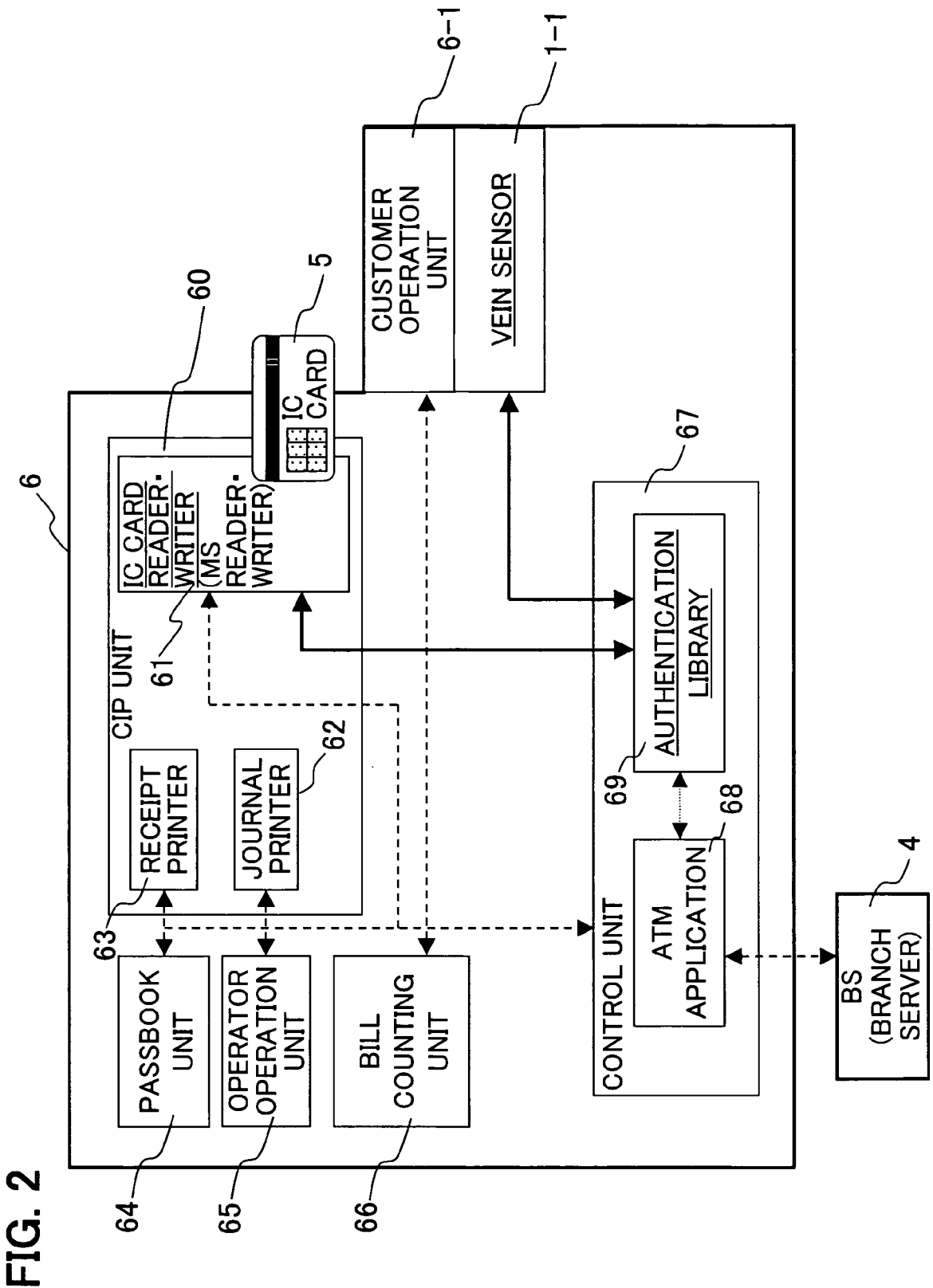
FIG. 2 is a block diagram of the biometrics authentication device of FIG. 1.

FIG. 1 is an external view of the biometrics authentication device of one embodiment of the invention;

FIG. 2 shows the configuration of the biometrics authentication device of FIG. 1. In FIG. 1 and FIG. 2, an automated transaction machine having biometrics authentication functions is explained as an example of a biometrics authentication device.

As shown in FIG. 1, the ATM (automated transaction machine) 6 has, on the front face thereof, a card insertion/ejection aperture 6-4; a bankbook insertion/ejection aperture 6-5; a paper currency insertion/dispensing aperture 6-3; a coin insertion/dispensing aperture 6-2; and a customer operation panel 6-1 for operation and display.

Figure 3:
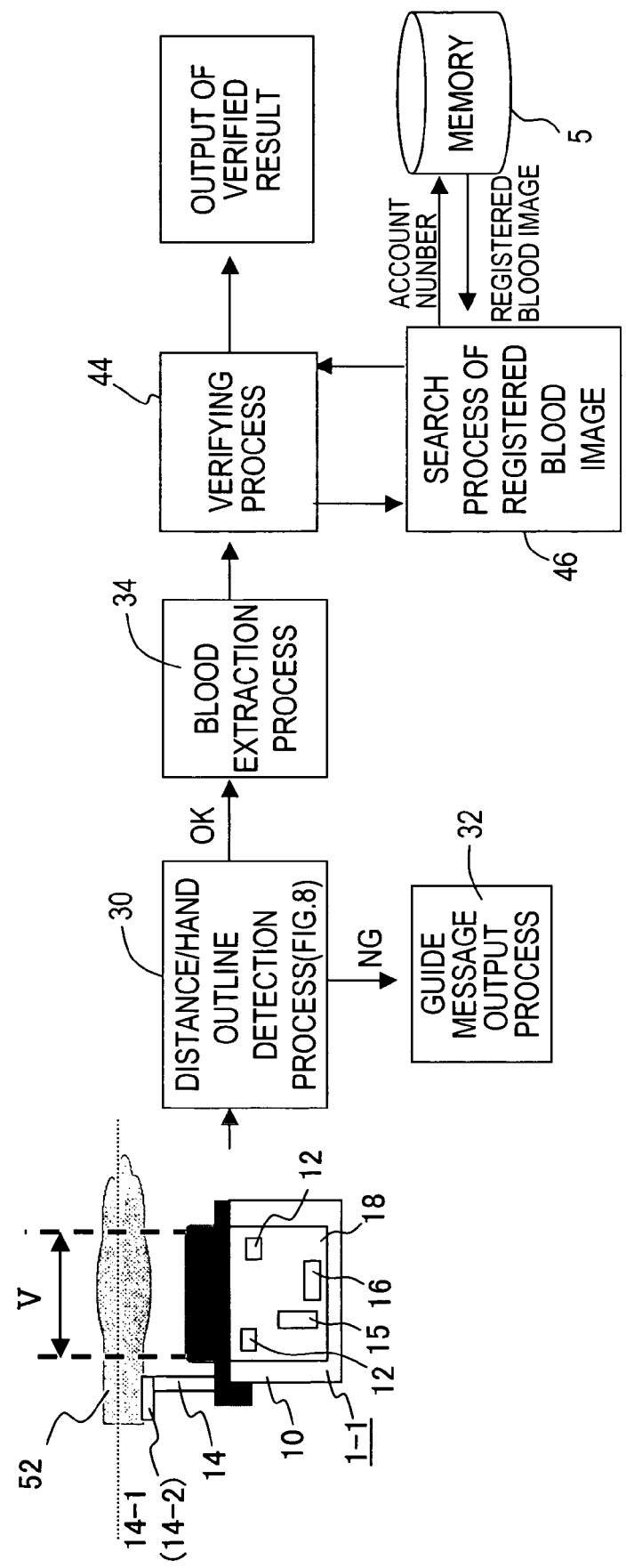
FIG. 3 is a functional block diagram of biometrics information verification processing in FIG. 2.

The image capture device 1-1 is provided on the side of the customer operation panel 6-1. The sensor unit 18 explained in FIG. 3 is mounted on the forward side of the main unit 10 of the image capture device 1-1. On the forward portion (on the user side) of the sensor unit 18 is provided a front guide 14. The front guide 14 comprises a sheet of synthetic resin, transparent or substantially transparent; the cross-sectional shape has a vertical body and, in the top portion, a horizontal portion 14-1 to support the wrist. A depression 14-2 is formed continuously in the center of the horizontal portion 14-1, to facilitate positioning of the wrist. Further, the sensor unit 18 of the main unit 10 faces rearward and is inclined upward, and a flat portion 22 is provided therebehind.

As shown in FIG. 2, the ATM 6 has a CIP (Card Reader Printer) unit 60 with a card insertion/ejection aperture 6-4; a bankbook unit 64 having a bankbook insertion/ejection aperture 6-5; a paper currency/coin counter unit 66 having a paper currency insertion/dispensing aperture 6-3 and a coin insertion/dispensing aperture 6-2; an attendant operation unit 65; a control unit 67; a customer operation panel 6-1 for operation and display; and an image capture device (vein sensor) 1-1.

The CIP unit 60 has an IC card reader/writer 61 which reads and writes the magnetic stripe and IC chip of an IC card 5; a receipt printer 63 which records transactions on a receipt; and a journal printer 62 which prints the history of transactions on journal forms.

The bankbook unit 64 records transactions on pages of a bankbook inserted through the bankbook insertion/ejection aperture 6-5, and when necessary turns the pages. The attendant operation unit 65 is for operations by an attendant, who can display the state and perform operations upon occurrence of a fault or during inspections. The paper currency/coin counting unit 66 validates, counts, and stores inserted paper currency and coins, and counts and dispenses paper currency and coins in the required quantities.

The control unit 67 communicates with the server 4, and has an ATM application 68 which controls ATM operation and an authentication library (program) 69 for authentication processing. A portion of this ATM application 68 acts in concert with the authentication library 69 to control biometrics authentication guidance screens of the customer operation panel (UOP) 6-1.

Figures 4, 5:
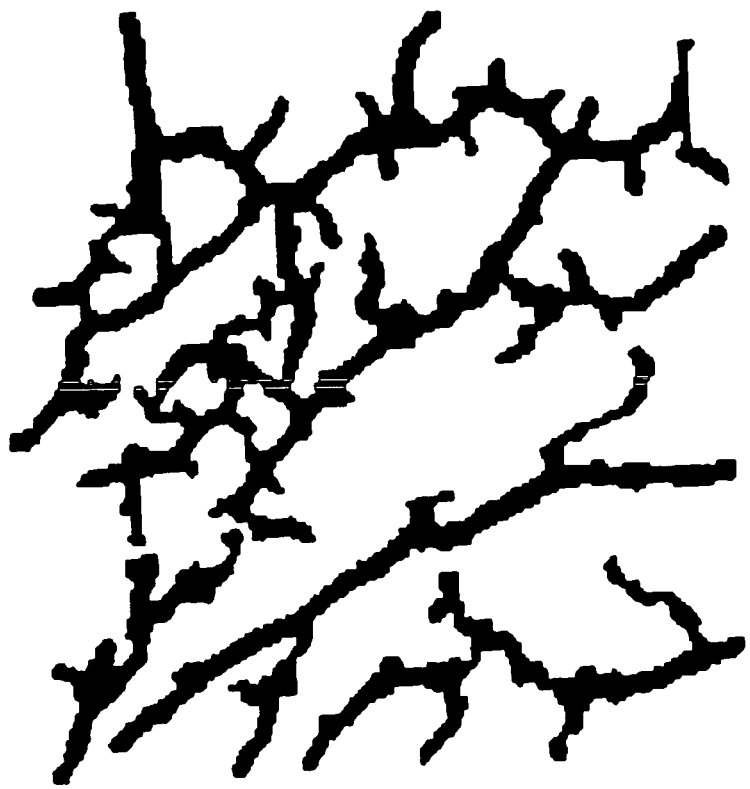
FIG. 4 explains the blood vessel images of FIG. 3.
FIG. 5 explains the blood vessel data of FIG. 3.

FIG. 3 is a block diagram of the biometrics authentication processing of one embodiment of the invention, FIG. 4 is an explanatory diagram of the blood vessel image in FIG. 3, and FIG. 5 is an explanatory drawing of the data used in the verification processing of FIG. 3.

As shown in FIG. 3, the palm image capture device 1-1 of FIG. 1 is equipped with a sensor unit 18 substantially in the center of the main unit 10. On the forward portion (on the user side) of the sensor unit 18 is provided a front guide 14. The front guide 14 comprises a sheet of synthetic resin, transparent or substantially transparent.

The front guide 14 serves the purposes of guiding the hand of the user in the front and of supporting the wrist. Hence the front guide 14 provides guidance to the user to guide and support the wrist above the sensor unit 18. As a result, the attitude of the palm of the hand, that is, the position, inclination, and size over the sensor unit 18 can be controlled. The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist.

The sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements 12 are provided at eight places on the periphery, to emit near-infrared rays upwards.

The readable region V of this sensor unit 18 is regulated by the relation between the sensor, focusing lens, and near-infrared light emission region. Hence the position and height of the front guide 14 are set such that the supported palm is positioned in the readable region V.

When the hand is extended with palm flat, the palm has maximum area, and moreover is flat, so that when the palm is subjected to image capture in the image capture region V of the sensor unit 18, an accurate vein pattern which can be used in registration and verification is obtained. When the distance from the sensor unit 18 to the palm is within a prescribed range, a sharp, focused image is obtained by the sensor 16 of the sensor unit 18.

Hence as shown in FIG. 3, by having the front guide 14 support the wrist 52 above the sensor unit 18, the user's hand can be guided and supported such that the position, inclination and height of the palm above the sensor unit 18 are made precise with respect to the image capture range of the sensor unit 18.

The authentication library 69 of the control unit 67 of the ATM 6, connected to the image capture device 1-1, executes the series of registration processing 30 to 46. For example, the control unit 67 of the ATM 6 has a CPU, various memory, an interface circuit, and other circuits necessary for data processing. This CPU executes the series of registration processing 30 to 46.

Distance/hand outline detection processing 30 receives the distance measured by the distance sensor 15 of the image capture device 1-1, judges whether the palm of the hand or other object is at a distance in a prescribed range from the sensor unit 18 and also detects the outline of the hand from the image captured by the sensor unit 18, and judges from the outline whether the image can be used in registration and verification processing. For example, the palm may not appear sufficiently in the image.

Guidance message output processing 32 outputs to the UOP 6-1 of the ATM 6 a message to guide the palm to the left or right, forward or backward, upward or downward, when the distance measured by the distance sensor 15 indicates that the hand is outside the image capture range, or when the image cannot be used in registration and verification processing. By this means, the hand of the user is guided into position over the image capture device 1-1.

Blood vessel image extraction processing 34 extracts a vein image from the image of the hand when hand outline detection processing 30 judges that an image has been captured with the hand held correctly. That is, grayscale data of the image of the palm such as that of FIG. 5 is obtained through differences in reflectivity. The vein pattern image is an image like that shown in FIG. 4; the data is grayscale data such as that in FIG. 5.

Registered blood vessel search/registration processing 46 registers blood vessel image data in the storage portion of the IC chip in the IC card 5 shown in FIG. 1, and in addition retrieves the registered blood vessel image data R1, R2, R3 corresponding to the individual ID (account number) obtained from the IC card 5. Verification processing 44 compares the blood vessel image data N1 detected in blood vessel image detection processing 34 with registered blood vessel image data N2, performs verification processing, and outputs the verification result, as shown in FIG. 5.

Thus the biometrics authentication device operates by contact-free means, is user-friendly, and handles a large amount of data, so that high-precision individual authentication can be performed.

Configuration of Biometrics Authentication

Figure 6:
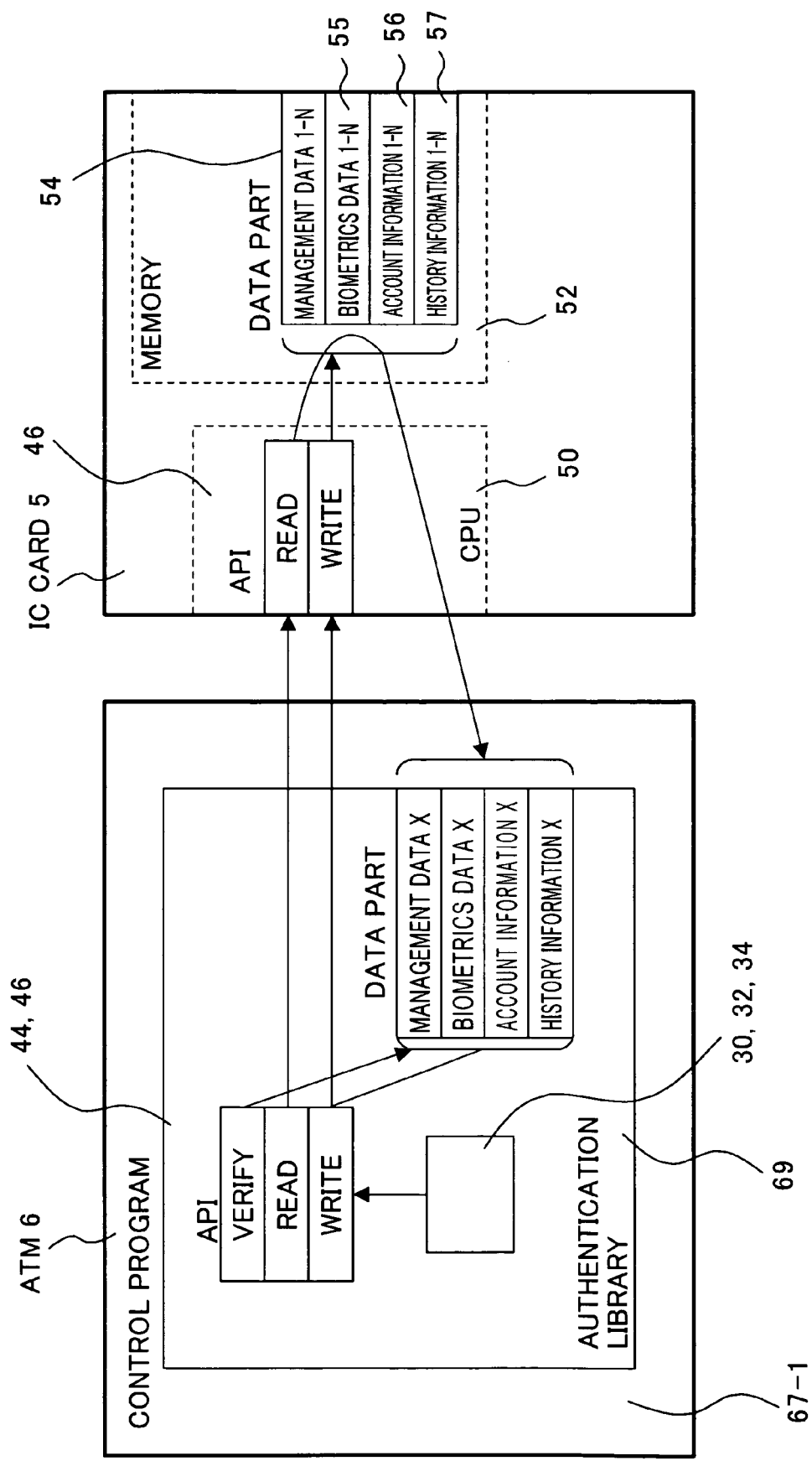
FIG. 6 shows the configuration of the authentication library and IC card of one embodiment of the invention.
Figure 7:
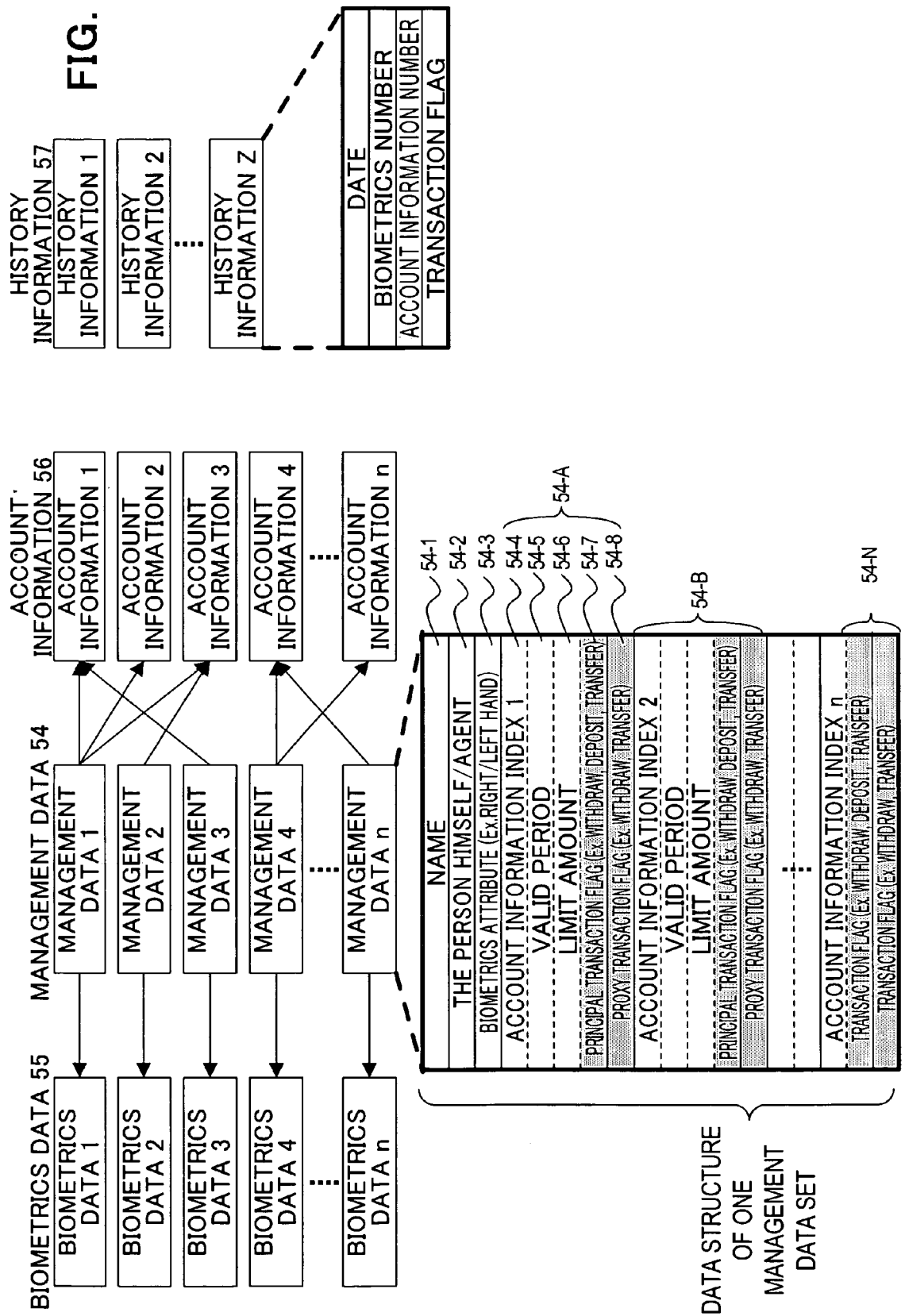
FIG. 7 explains the biometrics data and management data of the IC card in FIG. 6.

Next, FIG. 6 and FIG. 7 are used to explain the configuration of biometrics authentication in FIG. 2 and FIG. 3. FIG. 6 shows the configuration of the authentication library 69 and IC card 5 in FIG. 2 and FIG. 3; FIG. 7 shows the configuration of the data portion in the IC card 5 of FIG. 6.

As shown in FIG. 6, the authentication library (program) 69 provided in the control program 67-1 of the ATM 6 has the distance/hand outline detection processing portion 30, guidance message output processing portion 32, blood vessel image extraction processing portion 34, and the application interface (API). This API has verification processing 44 and a portion of the registered blood vessel image search/registration processing (read/write processing) 46, shown in FIG. 3.

On the other hand, the IC card 5 has a CPU (Central Processing Unit) 50 and memory 52. The CPU 50 executes the other portion of the registered blood vessel image search/registration processing (read/write processing) 46 shown in FIG. 3. The memory 52 has a management data area 54, biometrics data area 55, account information area 56, and history information area 57.

As shown in FIG. 7, access management information 1 through n, which associates biometrics data items 1 through n in the biometrics data area 55 with account information 1 through n in the account information area 56, is stored in the management data area 54.

Access management information (management data) 1 through n includes the registered name area 54-1, area to distinguish between principal and proxy (authorized agent) 54-2, biometrics attributes (for example, whether the registered blood vessel image is for the right hand or the left hand) area 54-3, and account specification areas 54-A, 54-B, . . . , 54-N. Each of the account specification areas 54-A (54-B through 54-N) includes an account information index 54-4, an expiration date for the account 54-5, a monetary limit for the specified account 54-6, a principal transaction flag (for example, withdrawals, deposits, transfers) 54-7 indicating valid transactions for the account, and a proxy transaction flag (for example, withdrawals, deposits) 54-8.

A transaction flag is a flag indicating whether each transaction for the account is valid or invalid; for example, in a savings deposit account, transactions are "withdrawal", "deposit", "transfer to another account", and "transfer between accounts".

The principal transaction flag 54-7 is a transaction flag set for the owner of the IC card 5 (the principal). When the principal/proxy distinction 54-2 in the access management information indicates the principal, the principal transaction flag indicates a principal transaction items set to valid by the principal; when the principal/proxy distinction 54-2 indicates proxy, the principal transaction flag indicates a proxy transaction item set to valid by the principal.

On the other hand, a proxy transaction flag indicates a proxy transaction item authorized by the principal. When the principal/proxy distinction 54-2 indicates proxy, this flag is set, and proxy transaction items set to valid by the principal or proxy are indicated.

Each management data record 1 through n is associated by an index, in a one-to-one relationship, with the biometrics data items 1 through n in the biometrics data area 55. On the other hand, the management data items 1 through n and account information are in a one-to-n relationship, with a single management data item associated with a plurality of account information items. That is, a plurality of account information sets are associated with the account indexes 1 through n of the management data, and the transaction flags can be used to define transactions permitted for the account (withdrawal, deposit, transfer, and similar).

The account information stores an account number and account type (checking, saving, fixed-term, or similar). The history information area 57 stores the history of transactions. As the history of transactions, the transaction date, biometrics data number, account information number, and transaction flag are stored.

Hence in this embodiment of the invention, a plurality of sets of management data and biometrics data are stored in the IC card 5, and biometrics data can be registered, deleted, and modified according to the details of the management data. That is, the biometrics data of the principal and of an authorized agent (called a "proxy") other than the principal, who has obtained the consent of the principal, can be registered on a single card, and both persons can be authenticated.

As explained below, through verification of the biometrics data of the principal, the identity of the principal can be confirmed, registration of the biometrics data of the above-mentioned proxy and other access can be permitted, and the security of registration of a proxy and similar using the registration card for the principal can be maintained.

Further, the management data can be used to associate the biometrics data with account information. Transaction flags for this management data can be used to specify transaction items and modify transaction items for the proxy. History information can be used to identify a person executing a transaction, even when a plurality of sets of biometrics data are stored.

Biometrics Information Registration/Authentication Processing

Figure 8:
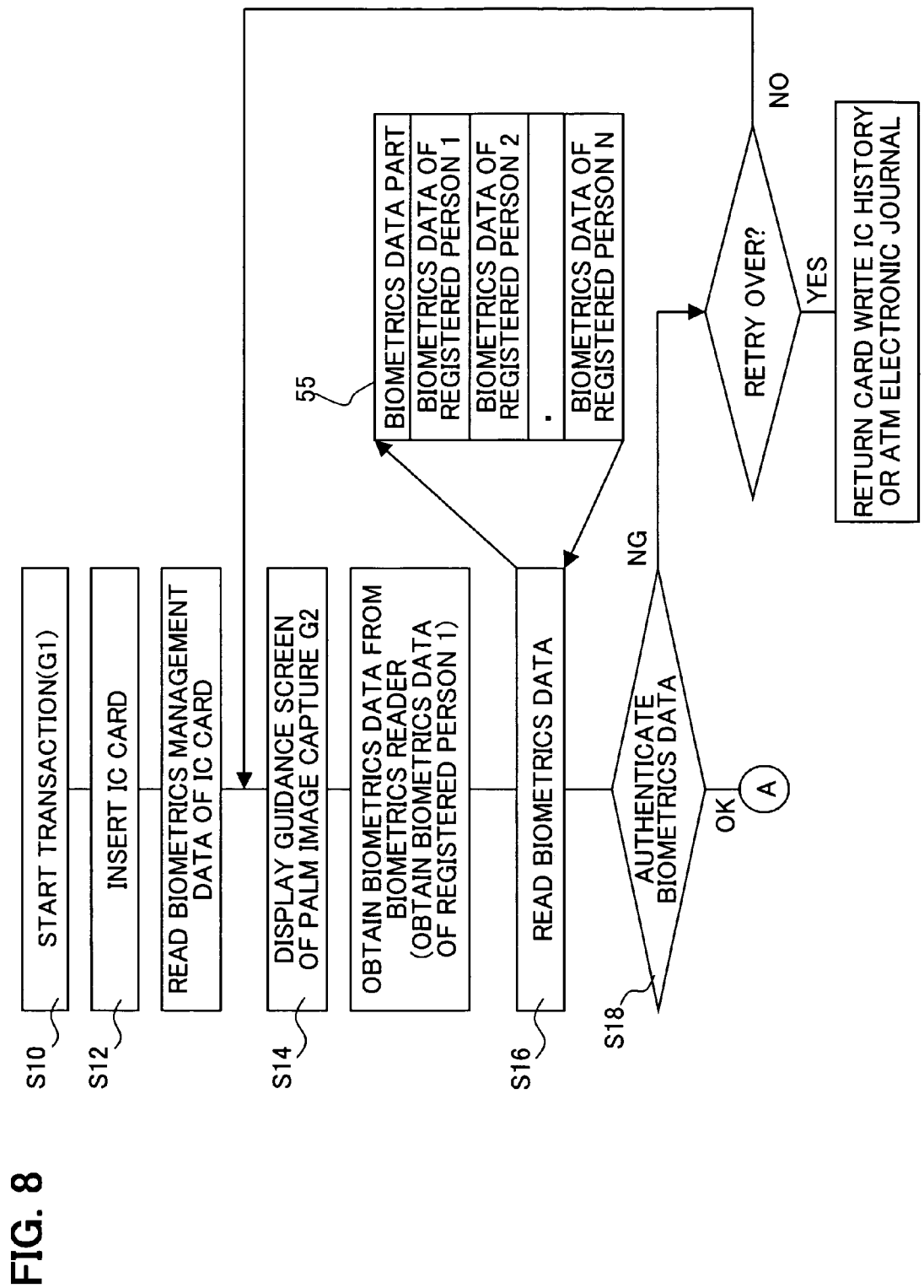
FIG. 8 is a first flow diagram of biometrics authentication and registration processing of this invention.
Figure 9:
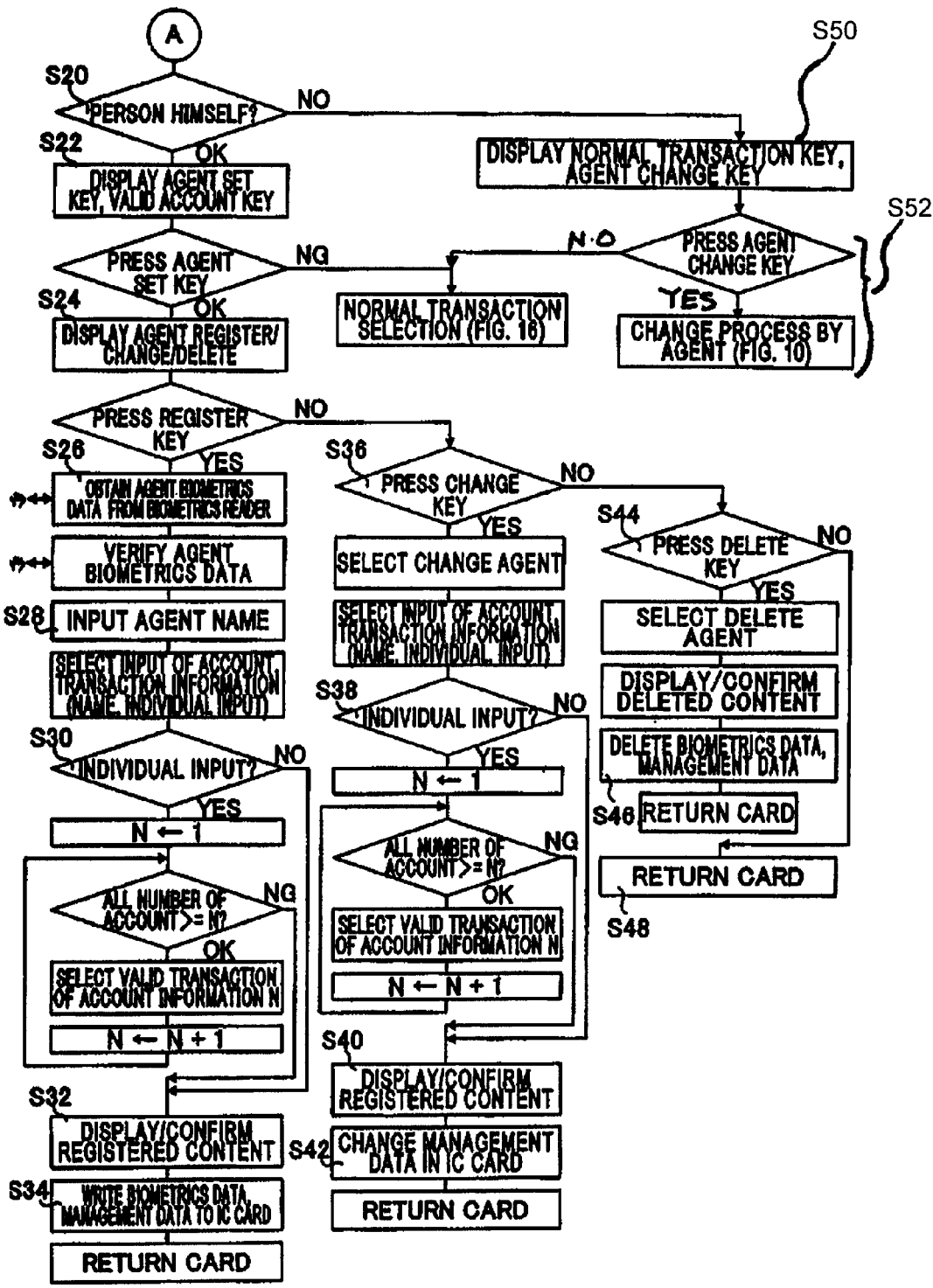
FIG. 9 is a second flow diagram of biometrics authentication and registration processing of this invention.
Figure 10:
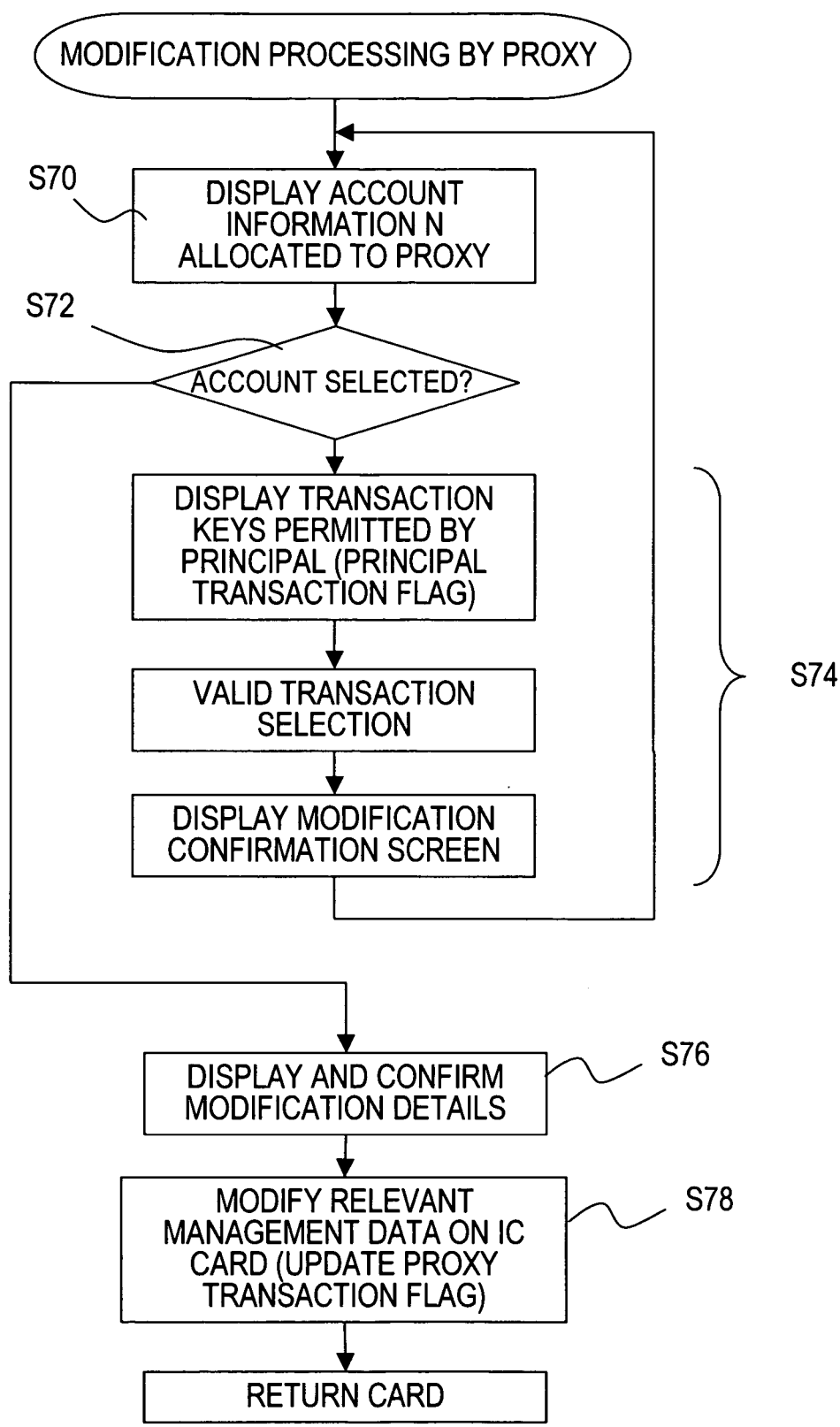
FIG. 10 shows the flow of proxy modification processing in FIG. 8.
Figure 11:
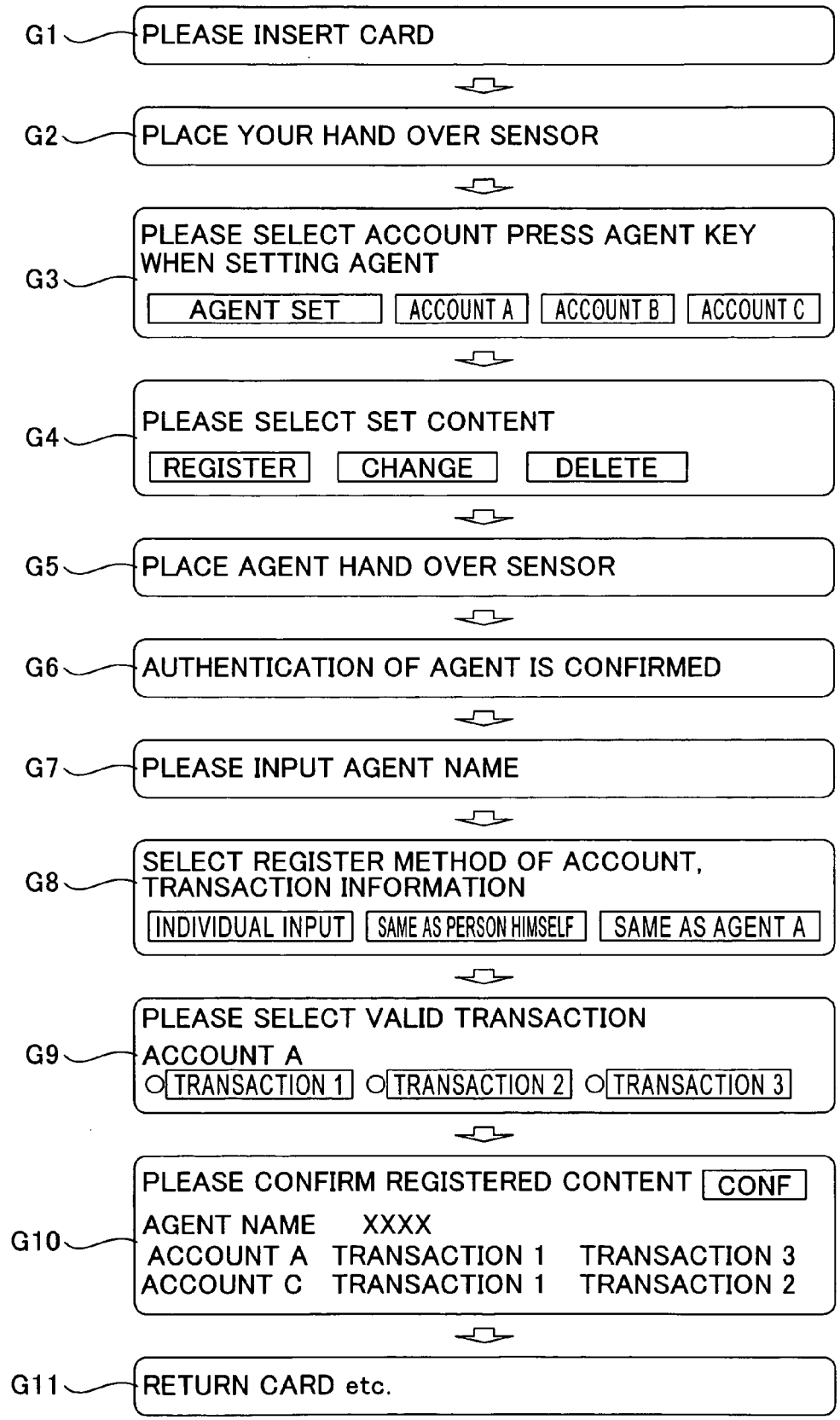
FIG. 11 explains the operation screens for registration processing in FIG. 8.

Next, biometrics information registration/authentication processing is explained, using FIG. 8 through FIG. 15. FIG. 8 through FIG. 10 are flow diagrams of biometrics information registration/authentication processing; FIG. 11 through FIG.

13 explain registration operation guidance screens of FIG. 8 through FIG. 10; and FIG. 14 and FIG. 15 explain management data.

Below, the biometrics information registration/authentication processing of FIG. 8 through FIG. 10 is explained, referring to FIG. 11 through FIG. 15.

(S10) In a customer wait state, the control unit 67 of the ATM 6 displays the IC card insertion screen G1 of FIG. 11 on the UOP 6-1.

(S12) When an IC card 5 is inserted by a customer, the API of the authentication library 69 in FIG. 6 issues a read command to the API 46 of the IC card 5, and reads the management data 54 (see FIG. 7) in the IC card 5.

(S14) The control unit 67 of the ATM 6 displays the palm image capture screen G2 in FIG. 11 on the UOP 6-1. The control unit 67 of the ATM 6 executes the image capture processing explained in FIG. 3, and acquires biometrics characteristic data.

(S16) The API of the authentication library 69 in FIG. 6 issues a read command to the API 46 of the IC card 5, and reads the biometrics data 55 (see FIG. 7) in the IC card 5.

(S18) The API of the authentication library 69 in FIG. 6 references the management data 54, verifies the biometrics characteristic data linked by the management data 54 against biometrics characteristic data obtained through image capture, and performs individual authentication. If the authentication result is not satisfactory (NG), a judgment is made as to whether the number of NG attempts is within a prescribed number. If within the prescribed number, processing returns to step S14. If however the number of NG attempts exceeds the prescribed number, the IC card 5 is returned. This fact is written to the history information 57 of the IC card 5, or is written to an electronic journal (memory) of the control unit 67 of the ATM 6, and processing ends.

(S20) Proceeding to FIG. 9, if on the other hand authentication result is OK (satisfactory) in step S18, a judgment is made as to whether the authentication OK is for the principal, based on the principal/proxy distinction 54-2 in the management data 54. If the authentication OK is not for the principal, processing proceeds to the proxy modification judgment processing of step S50.

(S22) On the other hand, if authentication is OK and the person is the principal, the proxy setting/transaction selection key screen G3 of FIG. 11 is displayed on the UOP 6-1. The proxy selection keys select whether to register, modify or delete a proxy; the transaction selection keys select accounts which can be used by the principal for transactions, based on the account indexes 54-4 in the management data 54. If the customer (principal) presses a transaction selection key, processing advances to the normal transactions in FIG. 16.

(S24) If on the other hand the customer (principal) presses the proxy selection key, the proxy registration/modification/deletion key screen G4 of FIG. 11 is displayed on the UOP 6-1.

(S26) If the customer (principal) presses the proxy registration screen, the proxy palm image capture screen G5 of FIG. 11 is displayed. When the proxy extends his hand over the image capture device 1-1, the control unit 67 of the ATM 6 executes the image capture processing explained in FIG. 3, and acquires biometrics characteristic data. Then, the image capture processing explained in FIG. 3 is again executed, and biometrics characteristic data is again acquired. The API of the authentication library 69 in FIG. 6 verifies the two sets of captured biometrics characteristic data against each other, to confirm the biometrics characteristic data for the proxy. If the verification result is OK, then the proxy verification confirmation screen G6 is displayed on the UOP 6-1.

(S28) The control unit 67 of the ATM 6 displays the proxy name input screen G7 of FIG. 11 on the UOP 6-1. When the customer (principal) or proxy inputs the proxy name from the screen on the UOP 6-1, the control unit 67 of the ATM 6 displays the account and transaction information input screen GB of FIG. 11 on the UOP 6-1. This input screen enables selection from among "Separate input", "Same as principal" and "Same as proxy A".

(S30) In step S28, if separate input is selected, the number of accounts pointer N for selection is initialized to "1". Here N is the number of accounts registered for the principal in management data 54. Then, the transaction detail selection screen G9 for the account registered with the principal with the number of accounts pointer N is displayed on the UOP 6-1. This screen G9 is a screen for selection of transactions (withdrawal, deposit, transfer to another account, transfer between accounts, or similar) for account A registered for the principal transaction flag 54-7 of the principal in management data 54. Using this screen G9, valid transactions for the proxy can be selected for each account. The pointer N is incremented by "1", and the transaction detail selection screen G9 for the account of pointer N is similarly displayed, and valid transactions for the proxy are selected. This is repeated for the number of accounts registered with the principal, after which processing proceeds to step S32.

(S32) If in step S28 "Same as principal" or "Same as proxy A" is selected, the account index and transaction flag 54-7 of the management data 54 for the specified name is used, and the registration detail selection screen G10 indicating the account and valid transactions is displayed on the UOP 6-1. If however separate selection is chosen in step S30, the registration detail selection screen G10 for the separately selected details (accounts, valid transactions) is displayed on the UOP 6-1.

(S34) When in screen G10 the Confirm key is pressed, the corresponding biometrics data and management data are added to the IC card 5. That is, the API of the authentication library 69 in FIG. 6 issues a write command to the API 46 of the IC card 5, to append to the biometrics data 55 and management data 54 of the IC card 5 (see FIG. 7). Specifically, biometrics data is written to the biometrics data area 55, and management data 54 is created comprising the input proxy name, proxy category, attributes, and account specification information (account information index, expiration date, limit amount, principal transaction flag, and similar), and is written to the IC card 5. The media return screen G11 is then displayed on the UOP 6-1, and the IC card 5 is returned.

Figure 12:
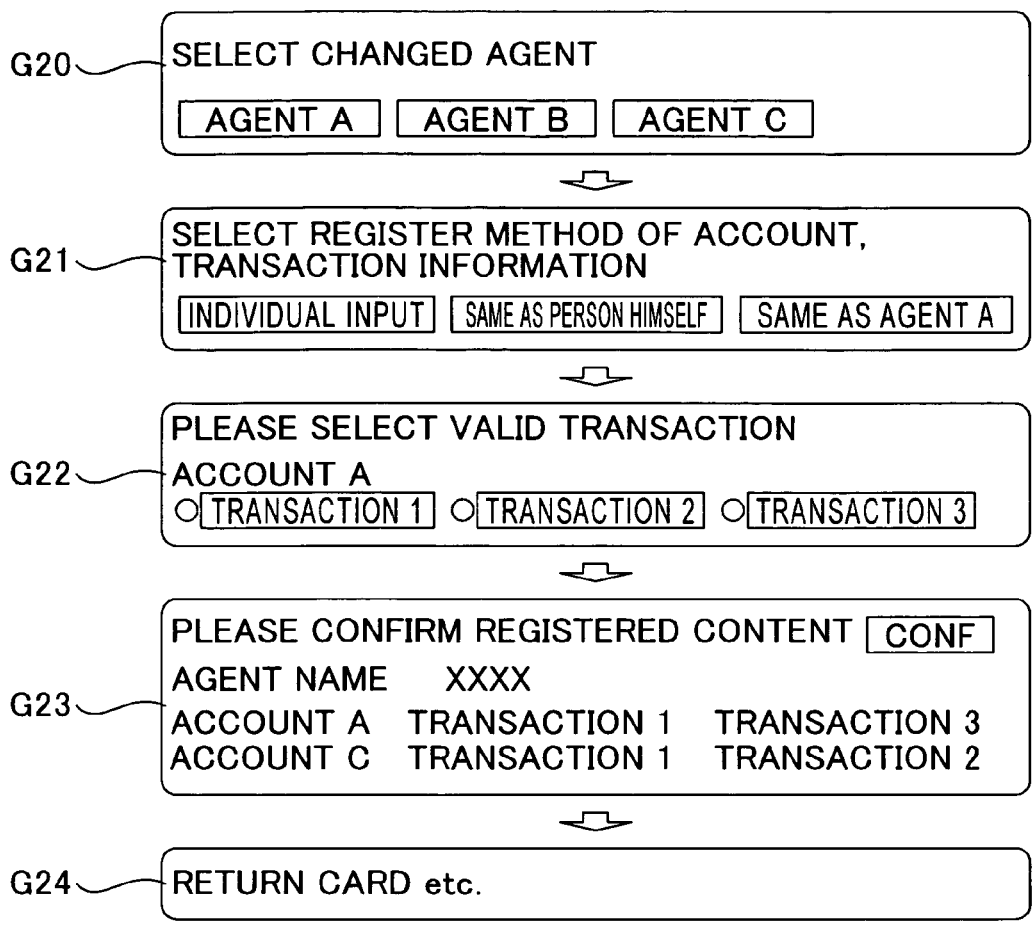
FIG. 12 explains the operation screens for modification processing in FIG. 8.

(S36) If on the other hand the Modify key is pressed in step S24, the control unit 67 of the ATM 6 displays the modify proxy input screen G20 of FIG. 12, displaying the names of all proxies registered, from the content of the management data 54, on the UOP 6-1. When the customer (principal) inputs the name of a proxy for modification from the screen of the UOP 6-1, the control unit 67 of the ATM 6 displays the account and transaction information input screen G21 of FIG. 12 on the UOP 6-1. This input screen enables selection from among "Separate input", "Same as principal" and "Same as proxy A".

(S38) In step S36, when separate input is selected, the number of accounts pointer N for selection is initialized to "1". Here N is the number of accounts registered for the principal in the management data 54 (the account index number). Then, the modification detail selection screen for accounts registered with the principal G22 with the account number pointer N is displayed on the UOP 6-1. This screen G22 is a screen for selection of transactions (withdrawal, deposit, transfer to another account, transfer between accounts, or similar) for account A registered with the principal in management data 54 with the principal transaction flag 54-7. This screen G22 is used to select valid transactions for the proxy for each account. The index N is then incremented by "1", and the modification detail selection screen G22 for the account with pointer N is similarly displayed, and valid transactions for the proxy are selected; this is repeated for all the accounts registered with the principal, after which processing proceeds to step S40.

(S40) Next, if in step S36 "Same as principal" or "Same as proxy A" is selected, the account index and transaction flag 54-7 of the management data 54 for the specified name is used, and the modification detail selection screen G23 showing the account and valid transactions is displayed on the UOP 6-1. If however separate selection is chosen in step S36, the modification detail selection screen G23 for the separately selected details (accounts, valid transactions) is displayed on the UOP 6-1.

(S42) When in screen G23 the Confirm key is pressed, the corresponding management data is modified in the IC card 5. That is, the API of the authentication library 69 in FIG. 6 issues a write command to the API 46 of the IC card 5, to modify the management data 54 (see FIG. 7) for the relevant proxy in the IC card 5. Specifically, the account information index and transaction flags are modified for the selected proxy. The media return screen G24 is then displayed on the UOP 6-1, and the IC card 5 is returned.

Figure 13:
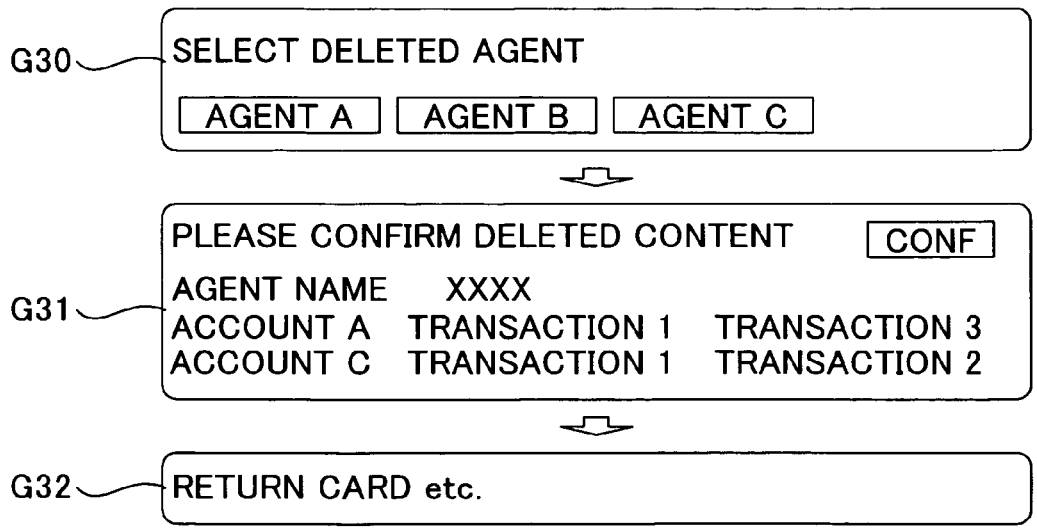
FIG. 13 explains the operation screens for deletion processing in FIG. 8.

(S44) If on the other hand the Delete key is pressed in step S24, the control portion 67 of the ATM 6 displays the delete proxy input screen G30 of FIG. 13, displaying the names of all proxies registered, on the UOP 6-1. When the customer (principal) inputs the name of a proxy from the screen of the UOP 6-1, the management data 54 for the specified name is used to display the deletion detail confirmation screen G31 on the UOP 6-1, displaying registration details (accounts, valid transactions) for the proxy.

(S46) When in screen G31 the Confirm key is pressed, the biometrics data 55 and management data 54 for the relevant proxy are deleted in the IC card 5. That is, the API of the authentication library 69 in FIG. 6 issues a write command to the API 46 of the IC card 5, to write null (all "1"s) to the biometrics data 55 and management data 54 (see FIG. 7) in the IC card 5. The media return screen G32 is then displayed on the UOP 6-1, and the IC card 5 is returned.

(S48) If on the other hand a key is not pressed for a prescribed time interval in step S44, or if the Cancel key is pressed, the IC card 5 is returned.

(S50) If on the other hand a person who has received a biometrics authentication OK in step S20 is judged not to be the principal (that is, is judged to be a proxy), a proxy normal transaction key/proxy transaction modification key screen is displayed on the UOP 6-1. The proxy transaction selection keys are used to select modifications to proxy transactions; the transaction selection keys indicate accounts for which transactions can be performed by the proxy, and are obtained from account indexes 54-4 in the management data 54.

(S52) Because this is a case in which the proxy has undergone biometrics authentication, the proxy can operate the device independently. When the proxy presses a transaction key, processing proceeds to a normal transaction of FIG. 16. On the other hand, when the proxy presses a proxy transaction modification key, processing proceeds to the modification processing by a proxy of FIG. 10.

Next, FIG. 10 is used to explain modification processing by a proxy.

(S70) When proxy transaction modification is selected, the accounts (account indexes) registered in the management data 54 for the proxy are referenced, and an account selection screen showing the accounts for the proxy is displayed on the UOP 6-1.

(S72) At this screen, the proxy either selects an account for modification, or selects an item to end modification.

(S74) At this screen, when the proxy selects an account for modification, the control unit 67 displays a proxy transaction selection screen G22 (see FIG. 12) on the UOP 6-1. This screen G22 displays selection item of transactions (withdrawal, deposit, transfer to another account, transfer between accounts, and similar) for account A by the proxy registered by the principal, which are registered by the principal transaction flag 54-7 in the management data 54. In this screen G22, the proxy selects valid proxy transactions for each account. Here, valid transactions are limited to those transactions set by the principal from the transaction flag 54-7 for the principal. When the proxy selects a valid transaction at this screen, a modification confirmation screen displaying the transaction made valid for the account A is displayed. When the proxy presses the Confirm key, processing returns to step S70, and transaction modification for the next account is executed.

(S76) When in step S72 "End modification" is selected, a modification detail confirmation screen G23 (see FIG. 12) for the selected details (accounts, valid transactions) made valid by the proxy is displayed on the UOP 6-1.

(S78) When at screen G23 the Confirm key is pressed, the relevant management data in the IC card 5 is modified. That is, the API of the authentication library 69 in FIG. 6 issues a write command to the API 46 of the IC card 5, and the management data 54 (see FIG. 7) for the proxy in question in the IC card 5 is modified. Specifically, the account information indexes and proxy transaction flags for the selected proxy are modified. The media return screen G24 is then displayed on the UOP 6-1, and the IC card 5 is returned. When for example the proxy management data 54 has the principal setting transaction flags (proxy) set to withdrawals, deposits, and transfers to another account, as shown in FIG. 15, the proxy can modify transactions within this range. Here, the proxy has not selected "withdrawals", that is, "deposits" and "transfers to another account" have been selected as valid transactions, so that the proxy flags for "deposits" and "transfers to another account" are updated to "1" (valid), and others are updated to "0" (invalid).

In this way, valid proxy transactions initially set by the principal can be modified by the principal, or by the proxy with validation by the principal, through the steps S36 through S42; moreover, in steps S70 through S78, the proxy can independently modify the valid proxy transactions. Hence proxy transactions can be modified appropriately according to the employment situation or family composition of the proxy, so that flexible transaction processing based on biometrics authentication can be realized.

As indicated in steps S38 and S74, valid transactions which can be selected by the proxy are in the range initially set by the principal, and so a transaction range which has been constricted can subsequently be broadened, within the range set by the principal.

Transaction Processing Using Biometrics Authentication

Figure 16:
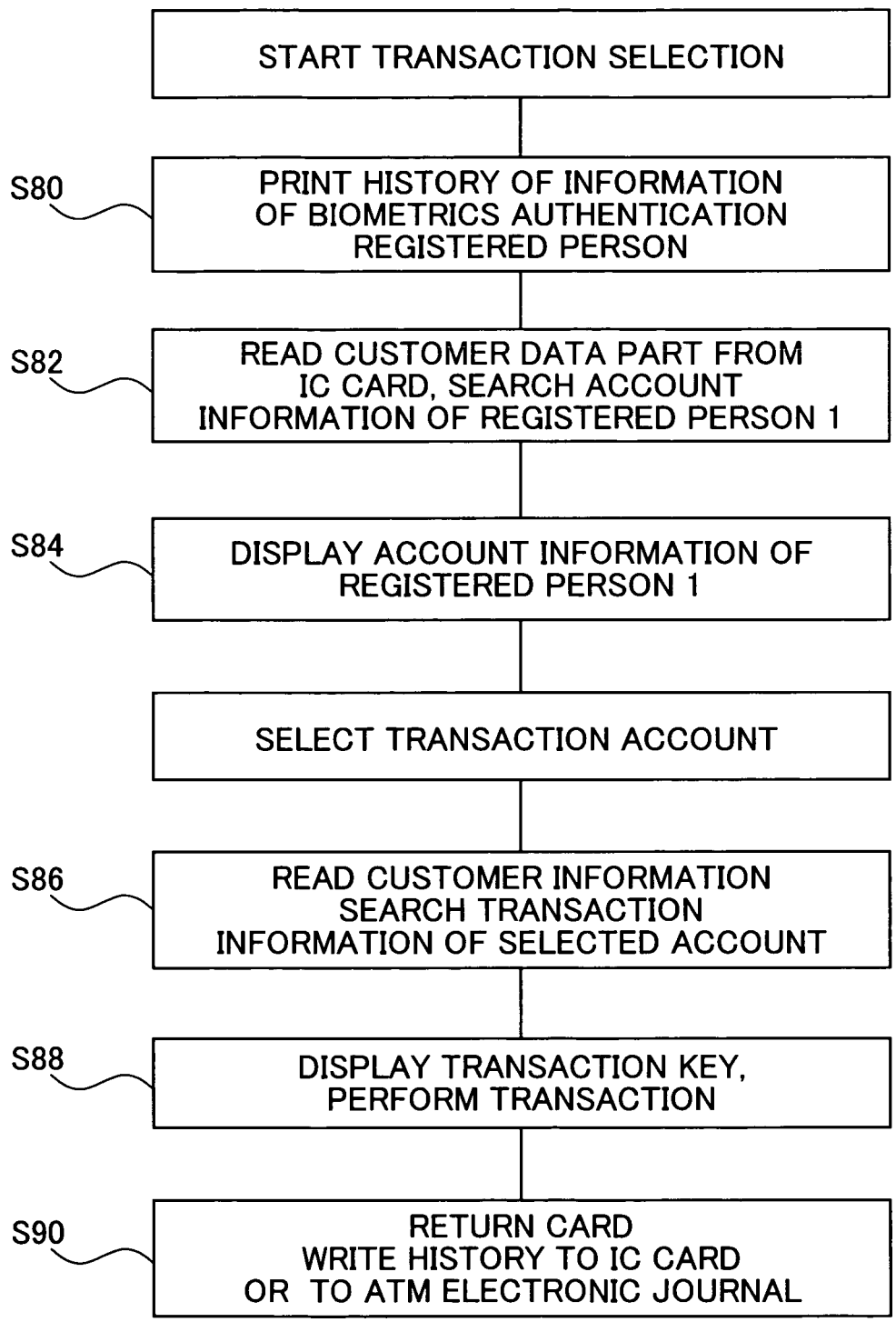
FIG. 16 shows the flow of normal transaction processing in FIG. 8.

Next, normal transactions by a proxy or by the principal in steps S22 and S52 are explained, using FIG. 16.

(S80) If the proxy or principal authentication is satisfactory, the information for the biometrics authenticated person (principal or proxy) is printed on the journal printer of FIG. 2 as history information.

(S82) The customer data portion in the IC card 5 of the authenticated proxy or principal is read. That is, the API of the authentication library 69 in FIG. 6 issues a search command to the API 46 of the IC card 5, and account information 56 is read from the account index of the management data 54 (see FIG. 7) in the IC card 5 for the relevant person (principal or proxy).

(S84) The control unit 67 displays the read-out account information on the UOP 6-1. The user selects the account for the transaction (presses a displayed account) from the account information displayed on the UOP 6-1.

(S86) The customer information data portion in the IC card 5 of the authenticated proxy or principal is read. That is, the API of the authentication library 69 in FIG. 6 issues a search command to the API 46 of the IC card 5, and transaction flags for the account indexes in the management data 54 (see FIG. 7) in the IC card 5 for the relevant person are read. At this time, if the authenticated person is the principal, the principal transaction flags 54-6 in the principal management data are selected, whereas if the authenticated person is a proxy, the proxy transaction flags 54-7 of the proxy management data (see FIG. 14 and FIG. 15) are selected.

(S88) The control unit 67 displays the transaction details registered for the read-out accounts on the UOP 6-1. The user selects transaction details (presses a displayed transaction) from among the transaction details displayed on the UOP 6-1. As a result, well-known transaction amount input, transfer destination input (for transfer), and other transaction operations are performed, the control unit 67 communicates with the host, and transaction processing is executed.

(S90) After transaction execution, the transaction history is written to the history information 57 in the IC card 5. Or, the transaction history is written to an electronic journal (memory) of the control unit 67 of the ATM 6, and processing ends.

Thus when biometrics authentication of the principal is satisfactory, modification of proxy transaction items is performed, and so the transaction items for an authorized agent (proxy) can be modified securely on a card on which biometrics information for the principal is registered. Similarly, when biometrics authentication of a proxy is satisfactory, transaction items for the authorized agent (proxy) can be modified and deleted securely on a card on which biometrics information for the principal is registered.

Further, biometrics information and transaction items for a proxy can be modified securely on a card on which biometrics information for the principal is registered, so that security of biometrics authentication can be assured for authorized agents as well. Moreover, management data is provided in the IC card, so that even if use by a plurality of persons is enabled, registration and deletion of authorized agents, and registration and modification of transaction details, can be easily performed.

Other Embodiments

Figure 17:
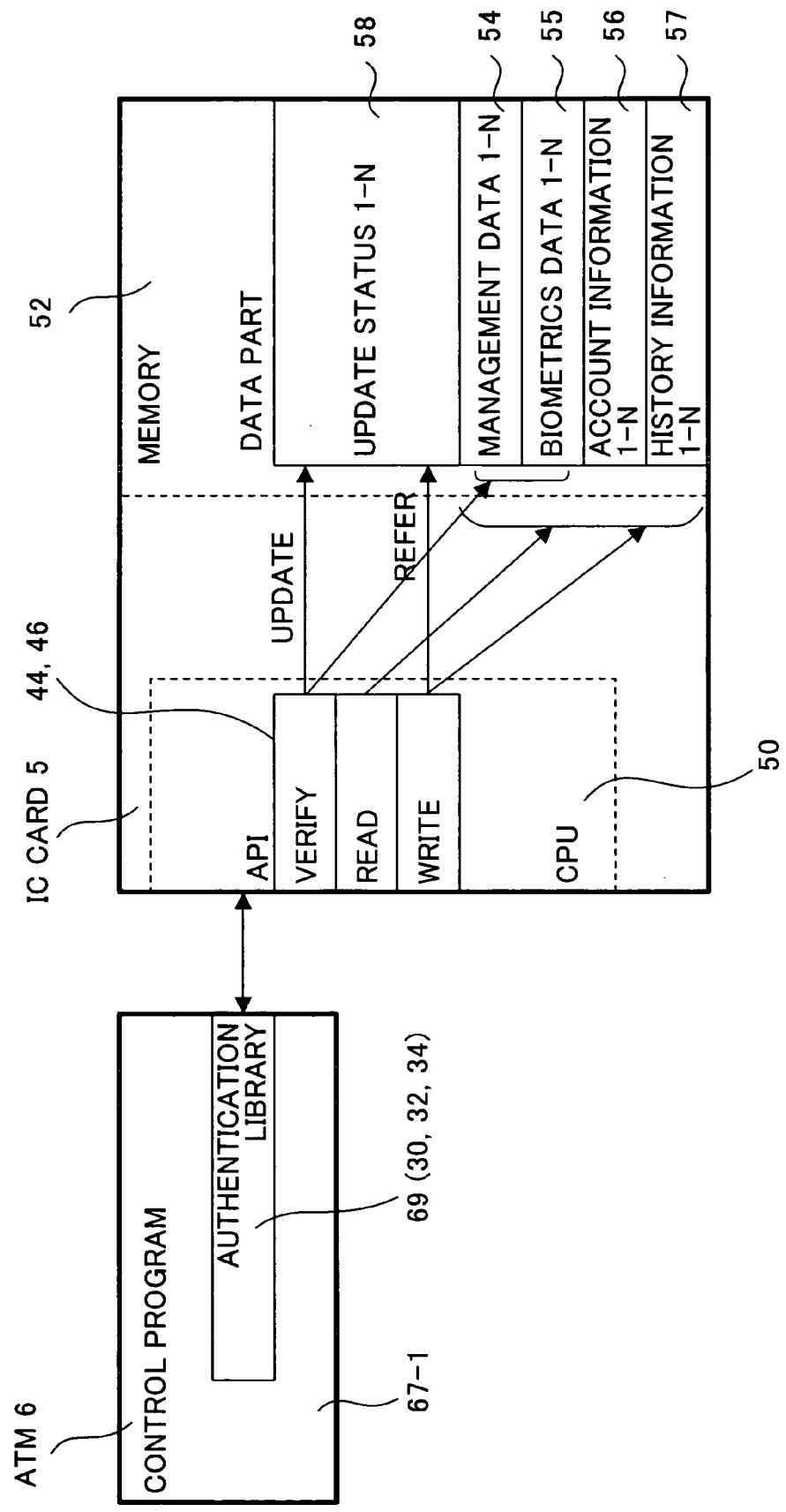
FIG. 17 shows the configuration of the authentication library and IC card in another embodiment of the invention.

FIG. 17 shows the configuration of the authentication library 69 and IC card 5 in an embodiment other than that of FIG. 2 and FIG. 3. As shown in FIG. 17, the authentication library (program) 69 provided in the control program 67-1 of the ATM 6 has the distance/hand outline detection processing 30, guidance message output processing 32, and blood vessel image extraction processing 34 as shown in FIG. 3.

On the other hand, the IC card 5 has a CPU (Central Processing Unit) 50 and memory 52. The CPU 50 executes the verification processing 44 and registered blood vessel image search/registration processing (read/write processing) 46 shown in FIG. 3. The memory 52 has the management data area 54, biometrics data area 55, account information area 56, and history information area 57 shown in FIG. 7.

In this embodiment, verification processing 44 is provided within the IC card 5, and update status information 58 is provided in each of the management data sets 54. In this verification processing 44, authentication processing is performed, and when the object of the authentication processing is the principal, the update status information 58 (1 to n) is rendered valid. Writing of management data 54 and biometrics information 55 can be executed when the relevant update status information 58*m* is valid. When the object of authentication processing is a proxy, updates of management data 54 are valid only for proxy flag writing.

If the relevant update status information 58*m* is invalid, an attempt to write management data 54 or biometrics information 55 causes an error to be returned. That is, when the result of authentication of the principal is satisfactory, writing of biometrics information 55 and management data 54, that is, proxy registration, modification and deletion, are possible. When the result of authentication of a proxy is satisfactory, updating of proxy transaction flags in the management data is possible. In this way, the security of individual information in the IC card 5 is assured, and in particular tampering is impossible, so that leaks of individual information (biometrics information, management information) can be prevented.

In the above-described embodiment, two types of transaction flags, which are principal transaction flags and proxy transaction flags, were explained; but a single transaction flag may be used, or specification of transaction items, instead of a flag format, is also possible.

Further, biometrics authentication was explained for the case of authentication of the vein pattern in the palm of a hand; but application to authentication using finger vein patterns, blood vessel image patterns of the back of the hand, palmprints and other characteristics of the hand, as well as to authentication using fingerprints, facial features, and to other contact-free biometrics authentication methods is possible. Further, automated equipment used in financial operations was explained; but application to automated ticket issuing equipment, automated vending equipment, and to automated machines and computers in other areas, as well as to door opening/closing equipment in place of keys, and to other equipment where individual authentication is required, is possible. For example, where used in place of keys, transactions may be provided with security stages, to permit entry into rooms in a plurality of stages.

In the above, embodiments of the invention have been explained; but the invention can be variously modified within the scope of the invention, and these modifications are not excluded from the scope of the invention.

Authorization details for a proxy, initially set by the principal, can be modified by the principal or by the proxy with the consent of the principal, and moreover authorization details for the proxy can be modified independently by the proxy. Hence the authorization details for the proxy can be modified as appropriate when there are changes in the employment situation or family composition of the proxy, so that flexible transaction processing based on biometrics authentication can be realized. Biometrics authentication can be securely performed for a plurality of persons using a single card, contributing to the widespread adoption of biometrics authentication devices.

What is claimed is:

1. A biometrics authentication method, comprising:
   a step of reading biometrics characteristics data from an IC (Integrated Circuit) card that registers biometrics characteristics data of a principal and an authorized agent other than the principal, a principal management data, which stores link information with the biometrics characteristic data of the principal and data of transaction items of the principal, and an agent management data that stores link information with the biometrics characteristic data of the agent and data of authorized transaction items of the authorized agent, which is selected within all transaction items by the principal, by an IC card reader/writer;

a step of detecting biometrics characteristic data from a body by a detection unit;

a first verification step of verifying the detected biometrics characteristic data against the read biometrics characteristic data of the principal and of the authorized agent registered in advance in the IC card by a control unit;

a step, when the verification is successful, of permitting modification of data of said authorized transaction items of the authorized agent by an operation unit which inputs the transaction items for withdrawal transaction and selects modification type and modification data;

a step of registering modified data of said authorized transaction items of the authorized agent in the IC card through the IC card reader/writer by controlling by the control unit;

a second verification step of verifying the detected biometrics characteristic data against the read biometrics characteristic data of the principal and of the authorized agent in the IC card by the control unit; and a step of executing a transaction within the authorized transaction items in the agent management data when the second verification result for the authorized agent is satisfactory;

wherein the permitting step comprises:

a step of judging whether a successful verification is for the principal or for the agent from the principal management data and the agent management data in the IC card when the verification is successful in the first verification;

a step, when judging that the verification for the authorized agent is successful, of displaying said authorized transaction items of the agent management data which are read from the IC card on a display unit of the operation unit and controlling an input for modifying data of said authorized transaction items from the operation unit to restrict the modification range of the data of said authorized transaction items within said authorized transaction items of the agent management data-of the verified agent which have been displayed;

a step of modifying the data of said authorized transaction items within said authorized transaction items which have been displayed from the operation unit by the verified agent;

a step, when judging that the verification for the principal is successful, of displaying selection menu of modification and deletion of the authorized agent on the display of said operation unit;

a step of controlling an input for modifying the data of said authorized transaction items of the authorized agent from the operation unit to restrict within said all transaction items of the principal management data which was read from the IC card when selecting the modification.

2. The biometrics authentication method according to claim 1, wherein the reading step comprises a step of reading the data of authorized transaction items registered in a flag format in the agent management data within the IC card, and wherein the registration step comprises a step of updating a flag in said flag format of the agent management data in within the IC card using the modified transaction items for the authorized agent.

3. The biometrics authentication method according to claim 2, wherein the reading step comprises a step of reading flag-format principal authorized transaction items of the principal management data, set by the principal in the IC card, and flag-format authorized agent transaction items of the agent management data, set by the authorized agent, and wherein the registration step comprises a step of updating a flag of the authorized agent transaction items of the agent management data in the IC card, using the modified transaction items of the authorized agent.

4. A biometrics authentication device, which detects biometrics characteristic data from a body, verifies the detected biometrics characteristic data against biometrics characteristic data registered in advance in an IC (Integrated Circuit) card, and performs individual authentication, comprising:

an IC card reader/writer which reads the biometrics characteristics data from the IC card which registered the biometrics characteristics data of a principal and an authorized agent other than the principal, a principal management data, which stores link information with the biometrics characteristic data of the principal and data of transaction items of the principal, and an agent management data that stores link information with the biometrics characteristic data of the agent and of authorized transaction items of the authorized agent, which is selected within all transaction items by the principal;

a detection unit for detecting the biometrics characteristic data from a body;

a cash counting unit configured to count cash and dispense the cash;

an operation panel which inputs the transaction items for withdrawal transaction and selects modification type and modification data; and a verification unit for verifying the detected biometrics characteristic data against the read biometrics characteristic data of the principal and of the authorized agent, registered in advance on the IC card, displaying the transaction items on the operational panel and controlling the cash counting unit according to an input of the transaction items from the operation panel, when the verification is successful;

wherein the verification unit, when the verification is successful, permits modification of data of said authorized transaction items of the authorized agent and registers the modified data of said authorized transaction items of the authorized agent in the IC card, and wherein the verification unit judges whether a successful verification is for the principal or for the agent from the principal management data and the agent management data in the IC card when the verification is successful, and wherein the verification unit, when judging that the verification for the authorized agent is successful, displays said authorized transaction items of the agent management data which are read from the IC card on a display unit of the operation panel and controls an input for modifying data of said authorized transaction items from the operation panel to restrict the modification range of the data of said authorized transaction items within said authorized transaction items of the agent management data of the verified agent which have been displayed, and wherein the verification unit, when judging that the verification for the principal is successful, displays selection menu of modification and deletion of the authorized agent on the display of said operation unit, controls an input for modifying the data of said authorized transaction items of the authorized agent from the operation panel to restrict within said all transaction items of the principal management data which was read from the IC card.

5. The biometrics authentication device according to claim 4, wherein the verification device reads the data of authorized transaction items in a flag format in the agent management data within the IC card, and updates a flag in said flag format of the agent management data in the IC card using the modified transaction items for the authorized agent.

6. The biometrics authentication device according to claim 5, wherein the verification device reads flag-format principal authorized transaction items of the principal management data, set by the principal in the IC card, and flag-format authorized agent transaction items of the agent management data, set by the authorized agent, and updates a flag of the authorized agent transaction items of the agent management data in the IC card, using the modified transaction items of the authorized agent.

7. A biometrics authentication device, which detects biometrics characteristic data from a body, verifies the detected biometrics characteristic data against biometrics characteristic data registered in advance in a storage unit, and performs individual authentication, comprising:
the storage unit which registers the biometrics characteristics data of a principal and an authorized agent other than the principal, a principal management data, which stores link information with the biometrics characteristic data of the principal and data of transaction items of the principal, and an agent management data that stores link information with the biometrics characteristic data of the agent and data of authorized transaction items of the authorized agent, which is selected within all transaction items by the principal;
a detection unit for detecting the biometrics characteristic data from a body;
a cash counting unit configured to count cash and dispense the cash;
an operation panel which inputs the transaction items for withdrawal transaction and selects modification type and modification data; and
a verification unit for verifying the detected biometrics characteristic data against the read biometrics characteristic data of the principal and of the authorized agent, registered in advance on the storage unit, displaying the transaction items on the operational panel and controlling the cash counting unit according to an input of the transaction items from the operation panel, when the verification is successful, and
wherein the verification unit judges whether a successful verification is for the principal or for the agent from the principal management data and the agent management data in the IC card when the verification is successful, and
wherein the verification unit, when judging that the verification of the principal is successful and in response to an indication of an agent change menu on a display of the operation panel, controls an input for modification of data of said authorized transaction items of the authorized agent within the transaction items of the principal in the principal management data which was read from the IC card, and
wherein the verification unit, when judging that the verification of the agent is successful and in response to an indication of the agent change menu on the display, displays the authorized transaction items of the agent management data which was read from the IC card on the display unit of the operation panel and controls an input for modifying data of said authorized transaction items from the operation panel to restrict the modification range of the authorized transaction items within the transaction items of the authorized agent in the agent management data by the operation unit, and
wherein the verification unit registers the modified data of said authorized transaction items of the authorized agent in storage unit.

* * * * *